(12) United States Patent
Knoth et al.

(10) Patent No.: US 9,454,196 B2
(45) Date of Patent: Sep. 27, 2016

(54) ACTIVE PEAK POWER MANAGEMENT OF A HIGH PERFORMANCE EMBEDDED MICROPROCESSOR CLUSTER

(71) Applicant: Apple Inc., Cupertino, CA (US)

(72) Inventors: Matthias Knoth, San Jose, CA (US); Rohit Kumar, Santa Clara, CA (US); Eric Smith, Palo Alto, CA (US); Louis Luh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 672 days.

(21) Appl. No.: 13/929,331

(22) Filed: Jun. 27, 2013

(65) Prior Publication Data

US 2015/0006916 A1  Jan. 1, 2015

(51) Int. Cl.
| | | |
|---|---|---|
| *H02J 7/00* | (2006.01) | |
| *G06F 1/26* | (2006.01) | |
| *H02J 1/10* | (2006.01) | |
| *H02J 7/34* | (2006.01) | |
| *H02J 1/02* | (2006.01) | |

(52) U.S. Cl.
CPC . *G06F 1/26* (2013.01); *H02J 1/02* (2013.01); *H02J 1/10* (2013.01); *H02J 7/345* (2013.01); *Y10T 307/527* (2015.04)

(58) Field of Classification Search
CPC .............. G06F 1/26; H02J 1/02; H02J 1/10; H02J 7/345; Y10T 307/527
USPC ............................ 713/300; 307/48; 320/166
See application file for complete search history.

(56) References Cited

U.S. PATENT DOCUMENTS

| | | | |
|---|---|---|---|
| 6,097,109 A | 8/2000 | Fendt et al. | |
| 6,917,681 B2 | 7/2005 | Robinson et al. | |
| 6,938,119 B2 | 8/2005 | Kohn et al. | |
| 2008/0315829 A1* | 12/2008 | Jones | H02J 7/345 320/103 |
| 2009/0315401 A1 | 12/2009 | Yoshida et al. | |
| 2011/0279096 A1* | 11/2011 | Sonntag | H02J 7/34 320/166 |
| 2013/0063111 A1* | 3/2013 | Ivanov | H02M 3/1588 323/280 |

FOREIGN PATENT DOCUMENTS

| | | |
|---|---|---|
| DE | 19746546 | 3/1999 |
| EP | 2040362 | 3/2009 |
| EP | 2337180 | * 6/2011 |

OTHER PUBLICATIONS

Machine Translation of EP2337180 performed on Mar. 22, 2016, 9 pages.*

(Continued)

*Primary Examiner* — Nathaniel Pelton
(74) *Attorney, Agent, or Firm* — Meyertons, Hood, Kivlin, Kowert & Goetzel, P.C.; Neal E. Persky; Lawrence J. Merkel

(57) ABSTRACT

In some embodiments, a system may include at least one voltage controller. At least one of the voltage controllers may assess, during use, an occurrence of a predetermined condition. In some embodiments, the system may include an at least first capacitor. The at least first capacitor may be coupled to at least one of the voltage controllers such that at least one of the voltage controllers engages the at least first capacitor to supply additional current when the predetermined condition occurs. When the increase in current is no longer required the at least first capacitor may be disengaged. The at least first capacitor may be charged when disengaged until a predetermined capacity.

18 Claims, 2 Drawing Sheets

(56) References Cited

OTHER PUBLICATIONS

International Search Report and Written Opinion from PCT/US2014/036012, mailed Sep. 4, 2014, Apple Inc., pp. 1-8.

International Preliminary Report on Patentability in application No. PCT/US2014/036012 issued Jan. 7, 2016.

Office Action, Taiwan Application No. 103118484, mailed Jun. 17, 2015, 3 pages.

* cited by examiner

ACTIVE PEAK POWER MANAGEMENT OF A HIGH PERFORMANCE EMBEDDED MICROPROCESSOR CLUSTER

BACKGROUND

1. Technical Field

The present invention relates to systems and methods for active peak power management. More particularly, some embodiments disclosed herein relate to peak power management for a high performance embedded microprocessor cluster.

2. Description of the Related Art

Power supplies for handheld embedded systems typically are a tradeoff between cost, form factor, and sustainable current at the highest expected performance level. This allows for a price-optimized design while sustaining everyday performance requirements of the system.

However, some applications and/or specifically designed tests could be capable of exceeding the design limits and the system is required to regulate the performance of the microprocessor cluster to stay within the sustainable supply envelope.

To achieve peak performance for a limited duration and buffer current inrush events, chip package and board level capacitors are employed. These deliver peak current before the power supply regulation can catch up with demand. With each peak performance event, the power supply will recharge these system capacitors, adding to the base load of the power supply. If the power supply cannot meet this demand, the system experiences a voltage drop. To avoid failure of the system, operating margins for voltage and frequency of the processor system are added.

This arms race between CPU power requirements and power supply stiffness adds to the bill of materials without contributing to the average system performance. Reducing peak power without increasing the power supply capability and system operating margins has been achieved so far through: predictive power estimation at dispatch time of power intensive instructions and controlling of the dispatch rate for the power intensive instructions based on the predictions; and voltage drop sensor employment at CPU core supply lines for ad-hock dispatch rate reduction or clock dithering based on in flight instructions. Such methods improve the system, but do not influence the ratio between active decoupling capacitance and power supply stiffness. Hence, the power supply is still required to recharge all peak discharge capacitance on time to prevent a significant voltage drop.

Therefore a system including at least a power management unit and/or a method which actively moderates peak power demands would be highly desirable.

SUMMARY

In general advantages of the herein described systems and methods include an allowance of a relaxation of power supply stiffness but continued enabling of the system to provide peak performance bursts of high power instructions. Using the system described herein, a lower cost power supply may be used without compromising functionality during peak power events. Previous generations package level capacitors and supply bumps were often dimensioned and placed based on power virus diagnostics, a method which may be employed to assess peak power capacitor placement. Due to the active control factor of the system described herein, the amount of package and board level capacitance might not increase compared to previous implementations but supporting a higher peak performance.

In some embodiments, a system may include one or more voltage drop controllers (or more briefly, voltage controllers). The voltage controllers may be coupled to a subset of the capacitors provided on the power inputs to an integrated circuit, and may detect peak power events that are causing (or may cause) a drop in the power supply voltage. The voltage controllers may engage the subset of capacitors to supply additional current during the peak power events, which may enhance the stability of the power supply voltage during the peak power events. Subsequently, the subset may be disengaged and recharged. The recharge rate may be controlled through a series resistance, in some embodiments, to reduce the load of recharging the capacitors on the power supply. A power management unit may also be included. The power management unit may function to transmit a request to change a voltage supplied within the system to a new voltage level in response to a predetermined condition (including power gating events, power on events, changes in performance level of the circuitry in the integrated circuit etc.). In some embodiments, when an increase in voltage is required the subset of capacitor are engaged in order to provide additional energy in response to the predetermined condition.

BRIEF DESCRIPTION OF THE DRAWINGS

The following detailed description makes reference to the accompanying drawings, which are now briefly described.

Figure 1:
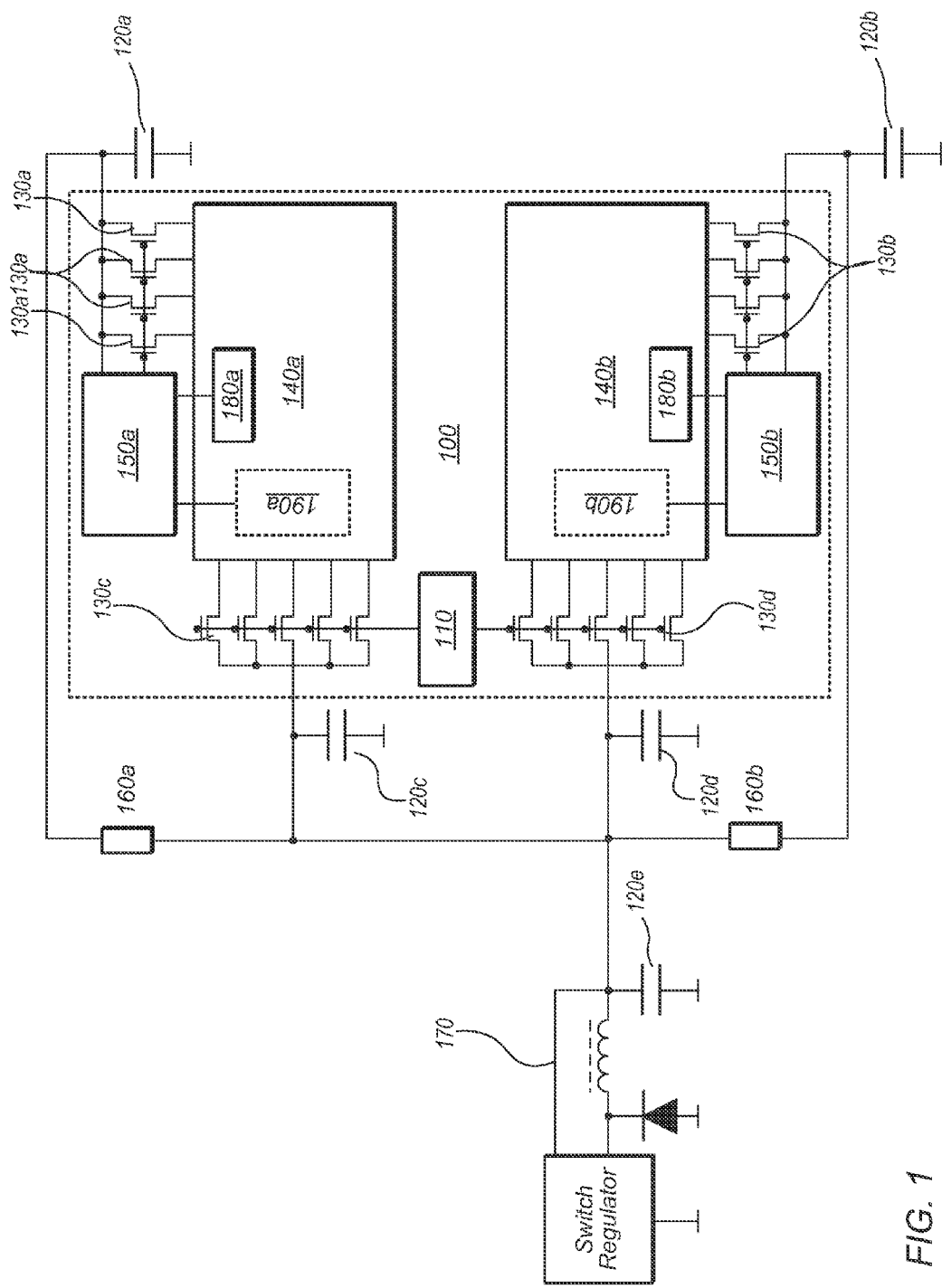
FIG. 1 depicts an embodiment of a diagram of a system including two voltage controllers used in combination with a high performance embedded microprocessor cluster.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified.

Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Figure 2:
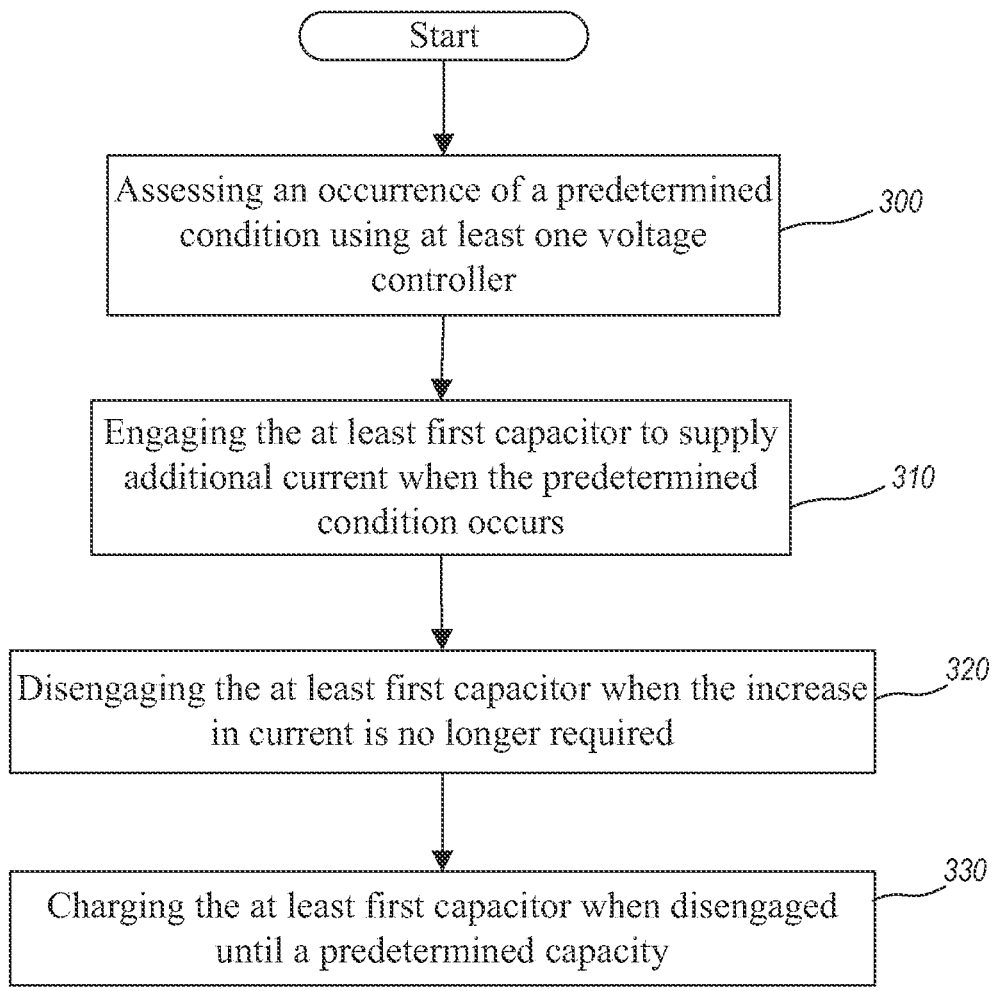
FIG. 2 depicts an embodiment of a diagram of a method managing peak power using at least one voltage controller.

In some embodiments, a system may include at least one voltage controller. FIG. 1 depicts an embodiment of a diagram of a system 100 (e.g., high performance embedded microprocessor cluster) including two voltage controllers 150a-b. FIG. 2 depicts an embodiment of a diagram of a method managing peak power using at least one voltage controller 150. At least one of the voltage controllers may assess 300, during use, an occurrence of a predetermined condition. In some embodiments, the system may include an at least first capacitor 120. The at least first capacitor may be coupled to at least one of the voltage controllers such that at least one of the voltage controllers engages 310 the at least first capacitor to supply additional current when the predetermined condition occurs. The voltage controllers may be coupled to a subset of the capacitors (e.g., first capacitors 120) provided on the power inputs to an integrated circuit, and may detect peak power events that are causing (or may cause) a drop in the power supply voltage. The voltage controllers may engage the subset of capacitors to supply additional current during the peak power events, which may enhance the stability of the power supply voltage during the peak power events.

When the increase in current is no longer required the at least first capacitor may be disengaged 320. The at least first capacitor may be charged 330 when disengaged until a predetermined capacity. The recharge rate may be controlled through a series resistance, in some embodiments, to reduce the load of recharging the capacitors on the power supply. A power management unit may also be included. The power management unit may function to transmit a request to change a voltage supplied within the system to a new voltage level in response to a predetermined condition (including power gating events, power on events, changes in performance level of the circuitry in the integrated circuit etc.). In some embodiments, when an increase in voltage is required the subset of capacitor are engaged in order to provide additional energy in response to the predetermined condition.

In some embodiments, capacitors 120a-b may be coupled to a separate set of power switches 130a-b. The power switches may couple capacitors 120a-b to CPU 140a-b respectively. The method may include disengaging 320 the at least first capacitor when the increase in voltage is no longer required.

Power switches 130a-b may form part of the overall power gating for one or more CPUs 140a-b, but in some embodiments the power switches may be engaged if the CPU exceeds a certain voltage drop margin or a predicted power draw exceeds a given threshold. The certain voltage drop margin may result from voltage controller employment at CPU core supply lines for ad-hock dispatch rate reduction or clock dithering based on in flight instructions. The predicted power draw may result from predictive power estimations at a dispatch time of power intensive instructions and control of dispatch rate based on the predictions.

The additional charge of capacitors 120a-b may bridge the completion time of in flight instructions and, depending on capacitor dimensioning, may provide an extension of a maximum performance window provided by the CPU.

In some embodiments, a system may include a voltage controller 150a-b which assesses a voltage level of at least the capacitor 120a-b. The power management unit 110 may notify the system when the voltage controller assesses insufficient voltage in response to the predetermined condition (in some embodiments the voltage controller may notify the system). With activation of peak power capacitors 120a the voltage drop controller may influence the CPU 140a instruction dispatch control to reduce the amount of high power instructions based on the available charge in the capacitor.

In some embodiments, the at least first capacitor is charged when disengaged until a predetermined capacity at a rate to inhibit an increase in an average peak power requirement of the system.

In some embodiments, the method may include charging 330 the at least first capacitor when disengaged until a predetermined capacity. In some embodiments, recharging of these peak power capacitors may be accomplished via charging resistors 160a-b coupled to the power supply 170. Resistors 160 may limit the charge current and are important to relieving the power supply from additional high currents. The power supply may be reduced in size using the systems and methods described herein, thereby reducing the size and/or costs associated with an apparatus.

In some embodiments, a resistor may be dimensioned based on a tradeoff of how often high performance bursts may be executed verses how much overhead charge current the power supply may provide.

In some embodiments, peak power capacitors 120a-b are in addition to capacitors 120c-d which couple CPUs 140a-b to capacitor 120e of power source 170. In some embodiments, capacitors 120c-d may be coupled to a separate set of power switches 130c-d respectively. The power switches may couple capacitors 120c-d to CPU 140a-b respectively.

In some embodiments, the system may be dimensioned to support a predefined window of high power instructions for temporal performance bursts while voltage controller 150 prevents power virus applications from immediate impact and guarantees a controlled reduction of CPU throughput.

In some embodiments, a system may include digital control 190a-b which assesses, during use, an occurrence of the predetermined condition. The predetermined condition comprises incoming high power instructions. In some embodiments, the digital control may be coupled to voltage control 150.

In some embodiments, a system may include analog control 180a-b which assesses, during use, an occurrence of the predetermined condition. The predetermined condition comprises a voltage decrease. In some embodiments, the analog control may be coupled to voltage control 150.

The voltage control may communicate with the digital control and/or the analog control to coordinate best usage of the charge in the peak power capacitor. The voltage control may ensure that the peak power capacitor recharges after use such that the capacitor is ready for when extra power is needed again. The voltage control alone or in combination with the power management unit may alert an appliance the system is associated with whether instructions requiring additional energy from the peak power capacitor may or may not be executed depending upon if the peak power capacitor is appropriately charged.

It should be pointed that either a digital control and/or an analog control may be associated with the system based upon the needs of the system. In some embodiments, both a digital control and an analog control may be used. In some embodiments, a digital control or an analog control may be used.

Circuits with higher speeds are being integrated at an increasingly higher density. As the result, on-chip Power-Ground voltage fluctuation is significantly increasing due to IR-drop, L di/dt noise, or LC resonance. Power-Ground integrity becomes a serious challenge in designing future high-performance circuits. A 10% supply voltage fluctuation may result in more than a 10% timing uncertainty. Circuit block gating is often introduced to reduce power, making sudden change of current likely and causing significant L di/dt noise. The inductance will also resonate with on-chip intrinsic and incorrectly inserted de-coupling capacitors and cause LC resonance. Large current oscillation may cause more power consumption and reliability problem, such as Electromigration.

A sudden change of the current flowing through a wire may induce abrupt voltage changes on that wire and its neighboring wires due to inductance. If these wires are part of the on-chip Power-Ground network, the induced voltage fluctuation is called L di/dt noise. In circuit, the current spikes are caused by gate switching.

In multiprocessor systems, the resistor may be adjusted based on the overall power supply load. For example, one or more power gated cores may allow the resistor to be bridged for an active CPU for highest peak performance. Voltage controller 150 may either monitor charge levels of capacitor 120a or wait a preprogrammed time constant of resistor 160 recharge time until the CPU supply voltage level is reached on capacitor 120a. After peak power capacitor 120a is recharged to an at least minimum acceptable level a dispatch rate of high power instructions may be increased.

In some embodiments, the power management unit senses oscillations resulting from changes in current consumption. The power management unit may disengage at least the capacitor 120a-b in response to the sensed oscillations such that the sensed oscillations are inhibited. A granularity of power switches activated at once allows a fine grain control of voltage drop and discharge of peak power capacitor 120a-b, allowing control of oscillations of die and package level supply lines due to di/dt changes caused by high power instructions. These oscillations occur at much shorter time scales than peak power capacitor discharges. A sufficiently fast voltage drop sensor modulates the number of enabled peak power capacitors switches to inhibit and/or quench oscillations.

In general advantages of the herein described systems and methods include an allowance of a relaxation of power supply stiffness but continued enabling of the system to provide peak performance bursts of high power instructions. Power gating methods are used in combination with power gate voltage drop control. Previous generations package level capacitors and supply bumps were often dimensioned and placed based on power virus diagnostics, a method which may be employed to assess peak power capacitor placement. Due to the active control factor of the system, the number of package and board level capacitance might not increase compared to previous implementations.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
    at least one voltage controller, wherein at least one of the voltage controllers may assess, during use, an occurrence of a predetermined condition;
    a capacitor coupled to at least one of the voltage controllers such that at least one of the voltage controllers engages the capacitor to supply additional current when the predetermined condition occurs, wherein when the increase in current is no longer required the capacitor is disengaged, and wherein the capacitor is charged when disengaged until a predetermined capacity; and
    a power management unit sensing, during use, oscillations resulting from changes in current consumption, and wherein the power management unit disengages the capacitor in response to the sensed oscillations such that the sensed oscillations are inhibited.

2. The system of claim 1, wherein the predetermined condition comprises a peak power event resulting in a decrease in a power supply voltage.

3. The system of claim 1, further comprising an analog control which assesses, during use, an occurrence of the predetermined condition.

4. The system of claim 1, further comprising an analog control which assesses, during use, an occurrence of the predetermined condition, wherein the predetermined condition comprises a voltage decrease.

5. The system of claim 1, further comprising a digital control which assesses, during use, an occurrence of the predetermined condition.

6. The system of claim 1, further comprising a digital control which assesses, during use, an occurrence of the predetermined condition, wherein the predetermined condition comprises incoming high power instructions.

7. The system of claim 1, wherein the capacitor is charged when disengaged until a predetermined capacity at a rate to inhibit an increase in an average peak power requirement of the system.

8. The system of claim 7, further comprising at least one resistor which controls, during use, the charge rate of the capacitor to reduce a load of recharging the capacitor on a power supply.

9. The system of claim 1, wherein at least one of the voltage controllers assesses a voltage level of the capacitor, wherein a power management unit notifies the system when the voltage controller assesses insufficient voltage in response to the predetermined condition.

10. The system of claim 1, further comprising a power management unit configured to transmit a request to change a voltage supplied within the system to a new voltage level in response to the predetermined condition.

11. A apparatus, comprising:
a first CPU;
a second CPU;
a first voltage controller, wherein the first voltage controller may assess, during use, an occurrence of a first predetermined condition; and
a first capacitor coupled to the first voltage controller such that the first voltage controller engages the first capacitor to supply additional current to the first CPU when the first predetermined condition occurs, wherein when the increase in current is no longer required the first capacitor is disengaged, and wherein the first capacitor is charged when disengaged until a first predetermined capacity;
a second voltage controller, wherein the second voltage controller may assess, during use, an occurrence of a second predetermined condition;
a second capacitor coupled to the second voltage controller such that the second voltage controller engages the second capacitor to supply additional current to the second CPU when the second predetermined condition occurs, wherein when the increase in current is no longer required the second capacitor is disengaged, and wherein the second capacitor is charged when disengaged until a second predetermined capacity; and
a power management unit configured to transmit a request to change a voltage supplied within a system to a new voltage level in response to the first and/or second predetermined condition, wherein the power management unit senses, during use, oscillations resulting from changes in current consumption, and wherein the power management unit disengages at least one of the first and the second capacitor in response to the sensed oscillations such that the sensed oscillations are inhibited.

12. A method, comprising:
assessing an occurrence of a predetermined condition using at least one voltage controller, wherein at least one of the voltage controllers is coupled to a capacitor;
engaging the capacitor to supply additional current when the predetermined condition occurs;
disengaging the capacitor when the increase in current is no longer required;
charging the capacitor when disengaged until a predetermined capacity;
sensing oscillations resulting from changes in current consumption using a power management unit; and
disengaging, using the power management unit, the capacitor in response to the sensed oscillations such that the sensed oscillations are inhibited.

13. The method of claim 12, further comprising assessing an occurrence of the predetermined condition using an analog control.

14. The method of claim 12, further comprising assessing an occurrence of the predetermined condition using an analog control, wherein the predetermined condition comprises a voltage decrease.

15. The method of claim 12, further comprising assessing an occurrence of the predetermined condition using a digital control.

16. The method of claim 12, further comprising assessing an occurrence of the predetermined condition using a digital control, wherein the predetermined condition comprises incoming high power instructions.

17. The method of claim 12, further comprising charging the capacitor when disengaged until a predetermined capacity at a rate to inhibit an increase in an average peak power requirement of a system.

18. The method of claim 12, further comprising:
assessing a voltage level of the capacitor using the voltage controller; and
notifying, using a power management unit, a system when the voltage controller assesses insufficient voltage in response to the predetermined condition.

* * * * *